(Model.)
R. P. BRYANT.
SHOE FASTENING.
No. 259,745. Patented June 20, 1882.
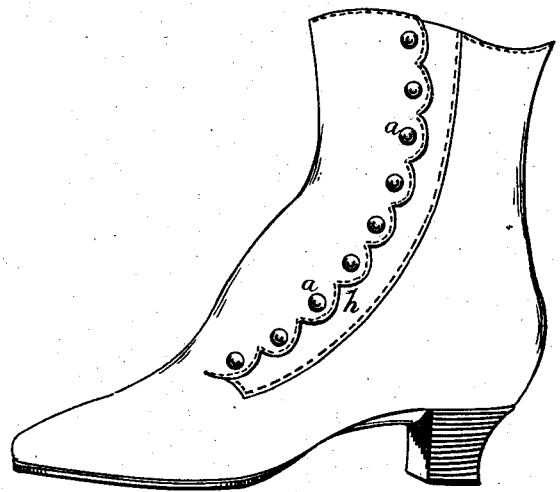
Fig. 1.
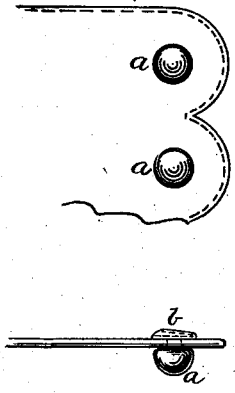
Fig. 2.
Fig. 5.
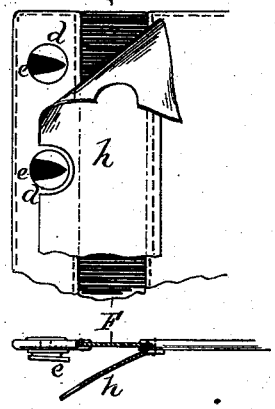
Fig. 3.
Fig. 6.
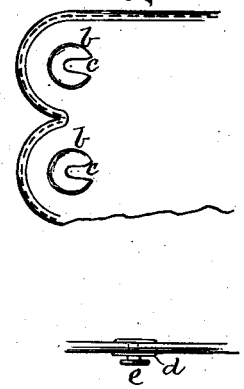
Fig. 4.
Fig. 7.
Witnesses
A. H. Egle
Edw. W. Down
Inventor.
Richard P. Bryant
By Atty J. N. Kalb

UNITED STATES PATENT OFFICE.

RICHARD P. BRYANT, OF SAN FRANCISCO, CALIFORNIA.

SHOE-FASTENING.

SPECIFICATION forming part of Letters Patent No. 259,745, dated June 20, 1882.

Application filed March 4, 1882. (Model.)

*To all whom it may concern:*

Be it known that I, RICHARD P. BRYANT, a citizen of the United States, and a resident of San Francisco, State of California, have invented certain new and useful Improvements in Shoe-Fastenings; and I do hereby declare that the following is a full, true, and exact description of the invention.

The object of my invention is to provide a simple and effective lacing or fastening device for connecting and securing together any two edges in order to close a slit or opening.

For the purpose of this specification I have represented my invention in its application for a shoe-fastening, simply remarking that the same construction and arrangement of devices can be used wherever two edges are to be closed together and fastened.

Referring to the accompanying drawings, Figure 1 is a side elevation of a shoe with my fastening applied. Fig. 2 is an enlarged view of a portion of the overlapping piece, showing the outside thereof; Fig. 3, an enlarged view of the underlapping piece, also showing the outside. Fig. 4 shows the under side of the overlapping piece. Fig. 5 is an edge view of the overlapping piece; Fig. 6, an edge view of the underlapping piece. Fig. 7 shows the stud formed as an ordinary flat button.

In my device I use buttons $a\ a$ simply as an ornament, as they form no part of my fastening device. They are merely secured to the outside or overlapping edge at the usual distance apart, and serve to give the shoe the appearance of button-shoes. They are not required, however, and might be left off entirely.

My fastening consists of two parts, one of which is a metallic plate, $b$, which I shall usually make circular in form. This plate I make concavo-convex, and it may form the under side of the eyelet by having its edges extended into a shape to form said eyelet. In other words, it can have a shank attached to it, like a rivet or eyelet, so that it can be fastened to the under side of the leather near the edge by passing the shank through the leather and heading it down, like an ordinary rivet or eyelet. The concave side fits next to the leather. In the edge of the plate which is farthest from the edge of the leather I make a V-shaped slot, $c$, extending in or near to the center of the plate. On the outside of the opposite piece of leather, and near its edge, I secure in like manner a plate, $d$, which has a V-shaped body or stud, $e$, on its upper face corresponding with the V-shaped slot $c$, as above described. The sides of this stud are drawn inward in the form of a dovetail, so that when the plate on the underlying edge has been drawn past the circular plate $d$ on the under side of the overlapping edge the stud $e$ will enter the V-shaped slot $c$ in plate $b$ and fasten the two parts together.

In order to provide the necessary elasticity to prevent overstraining the fastening and to keep the interlocking parts together, I insert a narrow strip of elastic, F, a short distance from the underlapping part—that is, the edge of the underlapping part is made up first of the narrow strip of elastic and the outside strip of leather, to which the stud parts of the fastenings are attached. I then secure a strip of leather, $h$, over the elastic strip by stitching its outer edges to the leather upper and allowing its opposite edge to be free. The free end of the leather covering-strip will then pass under the overlapping edge of the upper and conceal the elastic, and at the same time leave the elastic free to stretch as required.

The leather covering-strip can be ornamented as desired.

This fastening is simple and effective, and can be applied for various purposes.

Having thus described my invention, what I claim, and desire to secure by Letters Patent, is—

1. A shoe-fastening consisting of the raised plate $b$, having a V-shaped opening, $c$, cut in one side, and the dovetailed stud $e$, adapted to be inserted in the opening $c$ and under the plate $b$, said parts $b$ and $e$ provided with suitable attaching means, substantially as set forth.

2. A shoe lacing or fastening consisting of the plate $b$, with its V-shaped slot secured on the under side of the overlapping edge, and the plate $d$, with its dovetail V-shaped stud $e$ secured on the outside of the underlapping edge, in combination with the elastic strip F, interposed between the edge-strip and the shoe-upper and its covering leather strip $h$, all combined and arranged substantially as described.

RICHARD P. BRYANT.

Witnesses:
B. SCHLESINGER,
J. D. GAGNOW.